Jan. 31, 1956

S. J. PIRSON 2,733,353

AUTO-RADIOGRAPHY OF WELLS

Filed July 3, 1951

INVENTOR:
SYLVAIN J. PIRSON

BY *Newell Pottoff*

ATTORNEY

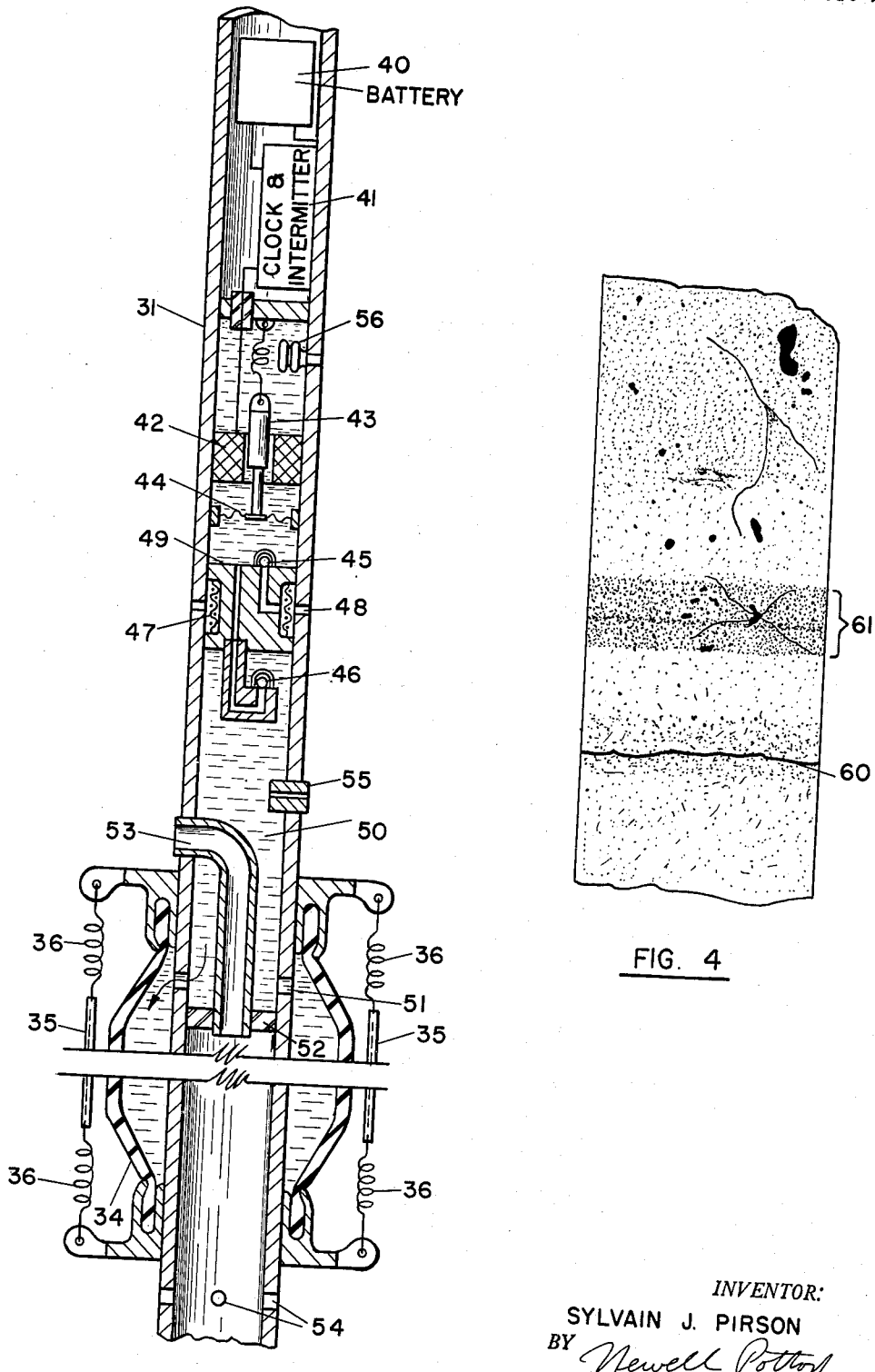

United States Patent Office 2,733,353
Patented Jan. 31, 1956

2,733,353
AUTO-RADIOGRAPHY OF WELLS

Sylvain J. Pirson, Tulsa, Okla., assignor to Stanolind Oil and Gas Company, Tulsa, Okla., a corporation of Delaware Application July 3, 1951, Serial No. 235,037

5 Claims. (Cl. 250—65)

This invention relates to the radiography of wells and is directed particularly to a method and apparatus for obtaining indications of the porosity and permeability of well formations in place.

Information on the porosity and/or permeability of well formations has been obtained most frequently by logging measurements in wells, which respond to the over-all effects of the properties of the well formations, or by the observation of cores recovered during the drilling process. Only in the latter case, however, from the observation of cores is any accurate information available as to the type of porosity and permeability occurring, that is, whether it is in the form of cracks, fissures, vugs, or intergranular porosity. Indications of the effects of various well treatments can sometimes be obtained by similarly treating cores in the laboratory, but it is well known that such indications can be misleading as to the effects of the well treatments on the porosity and permeability of the formations in place. Frequently cores are not recoverable or available from the formations of interest.

Various radioactivity measurements in wells have been proposed for giving porosity and permeability data; but they, like other logging measurements, provide an average response to a fairly large sample of the rocks, so that they have in the past been able to give only a general over-all picture of the formation porosity and permeability conditions. Photographs of bore-hole walls using ordinary visible light have also been attempted but with only moderate success and at relatively shallow depths, obvious difficulties being the cleaning of the formation face, the obtaining of transparent solutions within the well bore, and the complex instrumentation.

It is accordingly a primary object of my invention to provide a method and apparatus for securing accurate and detailed information on the permeability and porosity of formations in place. Other and more specific objects of my invention may be briefly enumerated as: to provide a method and apparatus for (1) accurately and simply making radiographs of the well formations at any time desired during the operation of a well, either before or after well treatments; (2) obtaining detailed photographic information about the porosity and permeability of well formations and the variations thereof in a well producing zone; (3) making radiographic exposures in wells by an instrument completely self-contained and not requiring electrical communication to the ground surface. Further and more specific objects, uses, and advantages of the invention will become apparent as the description proceeds.

In general, my novel method and apparatus comprises first placing in the zone of interest a liquid containing a solid radioactive material in suspension; forcing the well-bore liquids and the liquid components of the suspension into the well formations and thereby depositing the radioactive material on the face of the formations; removing excess amounts of radioactive material, if any; then lowering into position and pressing against the formation face a photographic medium; leaving the medium in contact with the formation face for a sufficient time to make an exposure by irradiation with the radioactive material; and finally withdrawing the medium and developing it to show the type of porosity and locations of permeability in the well bore in the pattern of the exposed portions of the medium.

This will be better understood by reference to the accompanying drawings forming a part of this application, in the different figures of which the same reference numerals are applied to the same or corresponding parts. In these drawings:

Figure 3 is a cross section of a portion of the instrument showing the parts in detail; and Figure 4 is a drawing of a typical record obtained in the practice of my invention.

Figure 1:
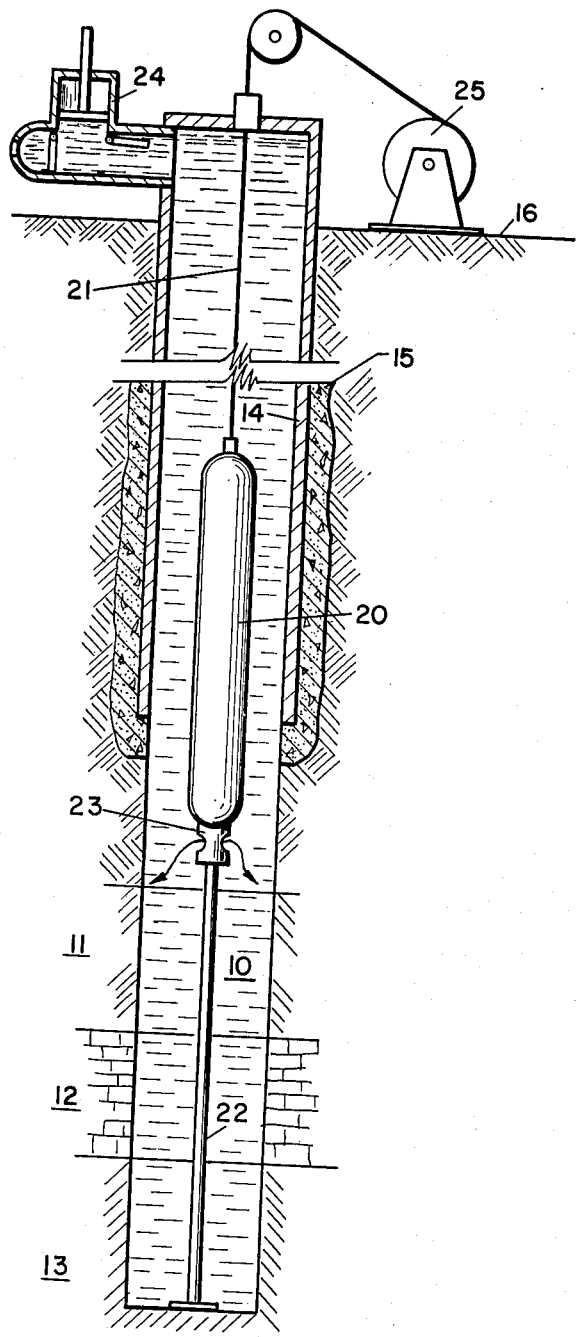
Figure 1 is a cross section of a well bore, showing the performance of the first steps of the invention.

Referring now to these drawings in detail and particularly to Figure 1, a well bore 10 is shown as penetrating a plurality of formations 11, 12, and 13, and is typically equipped with a casing 14 sealed by surrounding cement 15, the casing 14 extending to the ground surface 16. For determining the nature of the porosity and permeability of any of the formations, such as the formation 11, for example, a dump bailer 20 is lowered into the well 10 on a wire line 21 which may be unwound from a reel 22 at ground surface 16, the bailer 20 containing a radioactive material preferably in the form of a suspension of radioactive solid particles in a liquid medium. A rod 22, extending from the valve 23 at the bottom of bailer 20, makes contact with the bottom of well 10 in order to release the contents of the bailer at a point above the formation to be examined. Thereafter a pump 24, attached to casing 14 at the ground surface, is operated to apply pressure to the fluids filling the well bore and casing, thereby forcing the liquids and suspended solids from bailer 20 downwardly and outwardly into the surrounding formations, the liquid phase of the mixture penetrating the various formations according to their permeabilities and porosities and depositing the radioactive material out on the formation face. If it is not possible to place all of the radioactive materials against the formation face, then the excess amount remaining in the well bore is preferably removed by bailing before lowering the film-holding instrument, to avoid fogging of the film.

A number of such materials are suitable for use in my invention, for example, radioactive cobalt, which is preferably first ground to a particle size that is appropriate to the particular well to be examined, which particle size of radius $r$ is calculated from the expected porosity and permeability according to the equtation, $$r = \sqrt{\frac{8K}{\phi}} \times 10^{-4} \text{ cm.}$$

where K is the permeability in darcies, and $\phi$ is the porosity fraction. Other radioactive materials soluble in water, oil, or other liquids may be used in the form of a solution instead of the powdered solid, if desired, and if they are not forced too deeply into the formations. Thus, the penetration of a radioactive solution into the well formations can conveniently be retarded by adding to the liquid medium a suitable viscosity-increasing, bodying, or gelling agent in a manner well known in the art.

Figure 2:
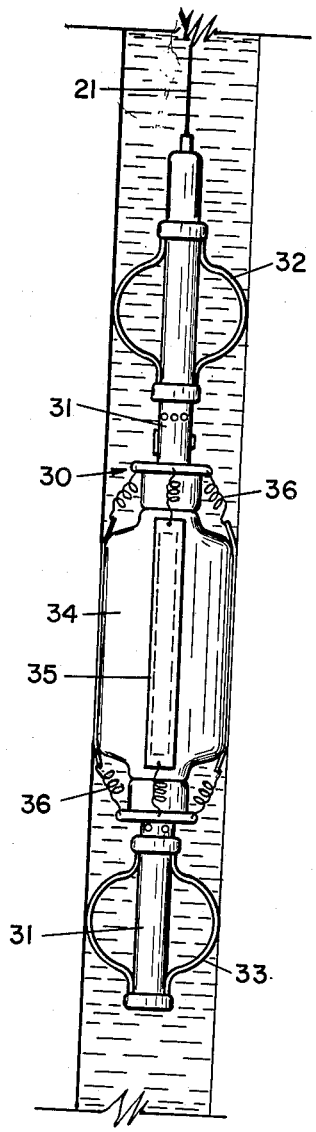
Figure 2 is a cross section of a portion of the well bore of Figure 1, with an elevation view of the instrument in testing position therein.

With the radioactive material now in place, an instrument 30 such as is shown in Figure 2, is lowered and placed in observation position. This instrument, which is lowered into the well 10 on the wire line 21, comprises a tubular mandrel 31 preferably provided near its ends with the centralizing springs 32 and 33 to hold the instrument centered in the well bore. On the central portion of the mandrel is an expansible rubber pressure sleeve 34, and a plurality of covered film strips 35, mounted between tension springs 36 which permit the film 35 to be pressed out laterally against the side of the well bore upon application of inflation pressure to the sleeve 34.

This will be more clearly understood by reference to Figure 3 showing in cross section a portion of this instrument. Thus, in the upper portion of the mandrel 31, is a battery 40 electrically connected to a clock and intermitter mechanism 41 which supplies intermittent current to the coil 42 of a solenoid pumping mechanism comprising the spring-biased ferromagnetic core 43 partly surrounded by coil 42 and attached to a flexible diaphragm 44. This pump mechanism includes an inlet check valve 45 and an outlet check valve 46, the fluid to the inlet valve being drawn through an annular screen 47 and ports 48 in the outer wall of mandrel 31 opening into the well bore.

The block 49 containing the screen and check valves forms a partition at the upper end of a closed space 50 from which ports 51 open to the interior of pressure sleeve 34, the bottom of space 50 being closed by the partition 52. As, in use, it is not desired that sleeve 34 act as a packer to inhibit flow of fluids along the well bore, a by-pass tube 53 opening into the well bore above the sleeve extends through the space 50 and the partition 52, thus, with the ports 54 below the sleeve, providing a fluid by-pass through it. A restricting orifice 55 permits fluid to leak out of space 50 into the well bore at a substantially slower rate than it is delivered thereinto when the pump is operating. Preferably the space surrounding the solenoid coil 42 and core 43 above diaphragm 44 is filled with oil or similar liquid and balanced as to hydrostatic pressure by a bellows or diaphragm 56 over an opening to the fluids in the well bore.

In operation, before instrument 30 is lowered into the well bore, the clock and intermitter mechanism 41 are set so that operation of the pump will begin, continue, and then stop at suitable time intervals after the instrument has been lowered into place. Then, after the instrument has been lowered, pulses of current from the battery 40 are applied to the coil 42 causing reciprocation of the core 43 and diaphragm 44, drawing in fluids from the well bore and forcing them into the interior of pressure sleeve 34, thereby expanding it. After a suitable interval of time, long enough for making the exposure of the film 35 held by sleeve 34 against the radioactive-material deposits on or in the surrounding formations, it being understood that the film 35 is enclosed in an opaque, thin protective sheeting such as of rubber or flexible plastic, the clock 41 stops the application of current pulses to the solenoid 42, and the orifice 55 lets the fluid within sleeve 34 exhaust back into well bore. When sleeve 34 is deflated, the instrument 30 is withdrawn, and the film 35 is developed and examined.

In Figure 4 is shown a section of recovered film bearing typical patterns representing those produced by various types of porosity. Thus, the general intergranular porosity is shown by the very fine spots of darkening of the film, whereas the larger spots correspond to vugs or solution cavities. The thin lines are interpretable as caused by fine cracks or fissures extending for considerable distances through the rock, whereas the more or less straight line 60 may be considered to be a horizontal fracture along a bedding plane such as might be caused by applying greater than formation-breakdown pressures during drilling or subsequent treatments. It is also possible to see details of stratification and dip as well as the major and minor porosity, the band 61, for example, corresponding to a highly porous and permeable belt, immediately above a thin zone of very small porosity. From films such as these, particularly if made before and after treatment of a well bore with acid or by hydraulic fracturing, for example, it is possible to ascertain much more accurately the exact effects of the well treatment. Also, by making exposures inside a well casing, it is possible to determine distribution of radioactive materials, such as radioactive cement, outside the casing.

While I have thus described my invention in terms of a typical embodiment thereof, it is to be understood that this is by way of illustration only, and the scope of the invention is not limited to the specific details described. The scope of the invention is rather to be ascertained from the appended claims.

I claim:

1. The method of radiographing a well formation which comprises first depositing at the formation face exposed in a well bore a radioactive solid material which is capable of lodging in the exposed formation openings, subsequently lowering into said well bore a photographic film and holding said film stationary and in contact with said face for a sufficient time to expose said film by radiations from primarily only the deposits of said material substantially in contact with said film, and finally removing and developing said film, whereby it may be examined for exposure patterns indicative of the character of individual formation openings.

2. The method of radiographing a well formation which comprises first depositing at the formation face exposed in a well bore a radioactive solid material ground to particle sizes of radius $r$ given approximately by the equation $$r = \sqrt{\frac{8K}{\phi}} \times 10^{-4} \text{ cm.}$$

where $\phi$ and $K$ are respectively the expected porosity fraction and the expected permeability in darcies, whereby said material lodges in the exposed formation openings, subsequently lowering into said well bore a photographic film and holding said film stationary and in contact with said face for a sufficient time to expose said film by radiations from primarily only the deposits of said material substantially in contact with said film, and finally removing and developing said film, whereby it may be examined for exposure patterns indicative of the character of individual formation openings.

3. The method of radiographing a well formation which comprises first lowering into a well bore a container holding a quantity of radioactive solid material dispersed in a liquid carrier, releasing said material and carrier from said container into the well liquids, applying pressure to said well liquids to force said liquids and carrier into the well formations and to deposit said radioactive material in the openings of the exposed formation face, removing from said well bore excess amounts of said radioactive material remaining therein after said pressure-applying step, subsequently lowering into said well a photographic film, pressing said film into contact with said formation face for a time sufficient to produce photographic exposure by radiations from primarily only the deposits of said radioactive material substantially in contact with said film, and finally removing and developing said film, whereby it may be examined for exposure patterns indicative of the character of individual formation openings.

4. Apparatus for use in the radiographing of well formations which comprises, in combination, a photographic film strip, means adapted to be lowered into a well for supporting said strip close to a well-formation face, means on said supporting means for pressing said strip into contact with said face, and means for controlling in a definite sequence the operation of said pressing means.

5. Apparatus for use in the radiographing of well formations which comprises a mandrel, at least one photographic film strip, means on said mandrel for resiliently supporting said photographic film strip spaced from and parallel to the axis of said mandrel, a resilient sleeve mounted on and surrounding said mandrel between the points of support of said film strip, means within said mandrel for applying fluid pressure inside said sleeve to expand it and thereby press said strip into intimate contact with a well formation, and means for controlling the operation of said pressure-applying means.

References Cited in the file of this patent

UNITED STATES PATENTS

| | | |
|---|---|---|
| 1,658,537 | Reinhold | Feb. 7, 1928 |
| 2,399,650 | Moyer | May 7, 1946 |
| 2,412,174 | Rhoades | Dec. 3, 1946 |
| 2,407,381 | Pecher | Sept. 10, 1946 |
| 2,544,412 | Bird | Mar. 6, 1951 |
| 2,560,510 | Hinson | July 10, 1951 |
| 2,588,210 | Crisman et al. | Mar. 4, 1952 |